United States Patent [19]
Gross et al.

[11] Patent Number: 5,602,886
[45] Date of Patent: Feb. 11, 1997

[54] NEURAL NET CONTROLLED TAG GAS SAMPLING SYSTEM FOR NUCLEAR REACTORS

[75] Inventors: Kenneth C. Gross, Bolingbrook, Ill.; Matthew T. Laug, Idaho Fall, Id.; John D. B. Lambert, Wheaton; James P. Herzog, Downers Grove, both of Ill.

[73] Assignee: The University of Chicago, Chicago, Ill.

[21] Appl. No.: 541,866

[22] Filed: Oct. 10, 1995

[51] Int. Cl.$^6$ ............................................. G21C 17/04
[52] U.S. Cl. ................................................ 376/253
[58] Field of Search ................................. 376/253, 251

[56] References Cited

U.S. PATENT DOCUMENTS

| | | | |
|---|---|---|---|
| 3,069,339 | 12/1962 | Jacobs | 376/253 |
| 3,070,532 | 12/1962 | Zebroski | 376/253 |
| 4,495,143 | 1/1985 | Gross et al. | 376/251 |
| 4,764,335 | 8/1988 | Gross et al. | 376/253 |
| 5,333,157 | 7/1994 | Gross | 376/251 |

OTHER PUBLICATIONS

IEEE Trans. on Neural Networks, vol. 6, No. 3 (May 1995), pp. 783–789, Comtat et al.
Artificial Neural Networks in Engineering–Proceedings, (ANNIE '94), (1994), pp. 897–902, Furukawa et al.

*Primary Examiner*—Harvey E. Behrend
*Attorney, Agent, or Firm*—Reinhart, Boerner, Van Deuren, Norris & Rieselbach, s.c.

[57] ABSTRACT

A method and system for providing a tag gas identifier to a nuclear fuel rod and analyze escaped tag gas to identify a particular failed nuclear fuel rod. The method and system include disposing a unique tag gas composition into a plenum of a nuclear fuel rod, monitoring gamma ray activity, analyzing gamma ray signals to assess whether a nuclear fuel rod has failed and is emitting tag gas, activating a tag gas sampling and analysis system upon sensing tag gas emission from a failed nuclear rod and evaluating the escaped tag gas to identify the particular failed nuclear fuel rod.

14 Claims, 7 Drawing Sheets

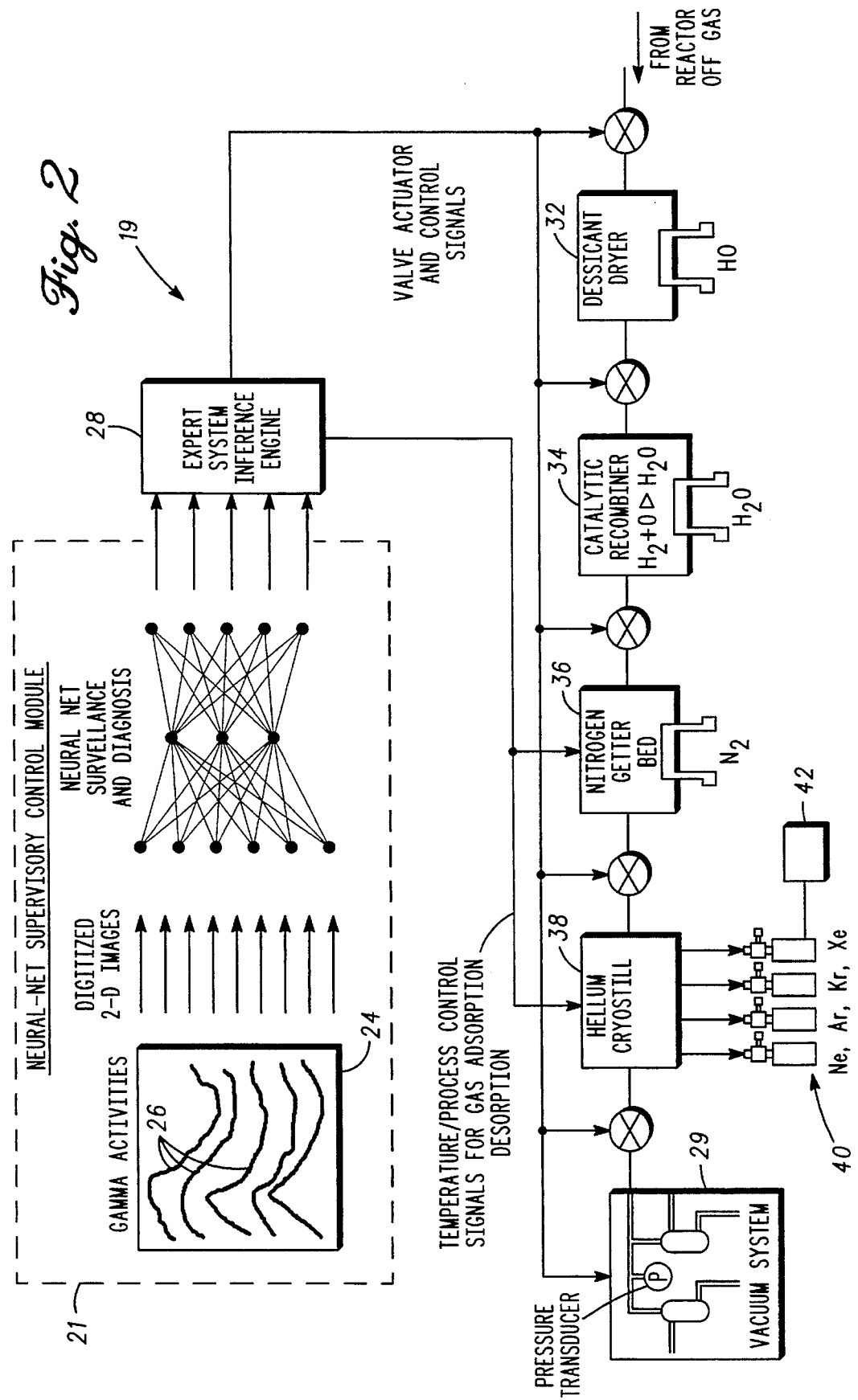

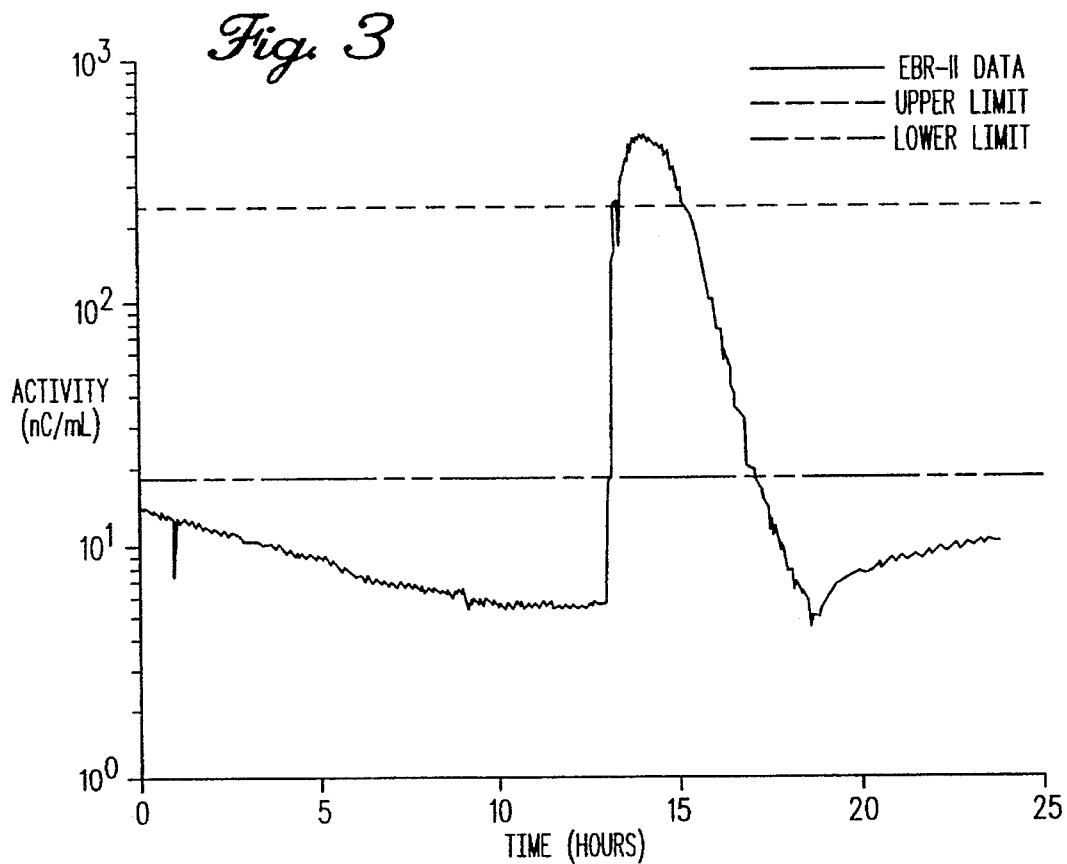
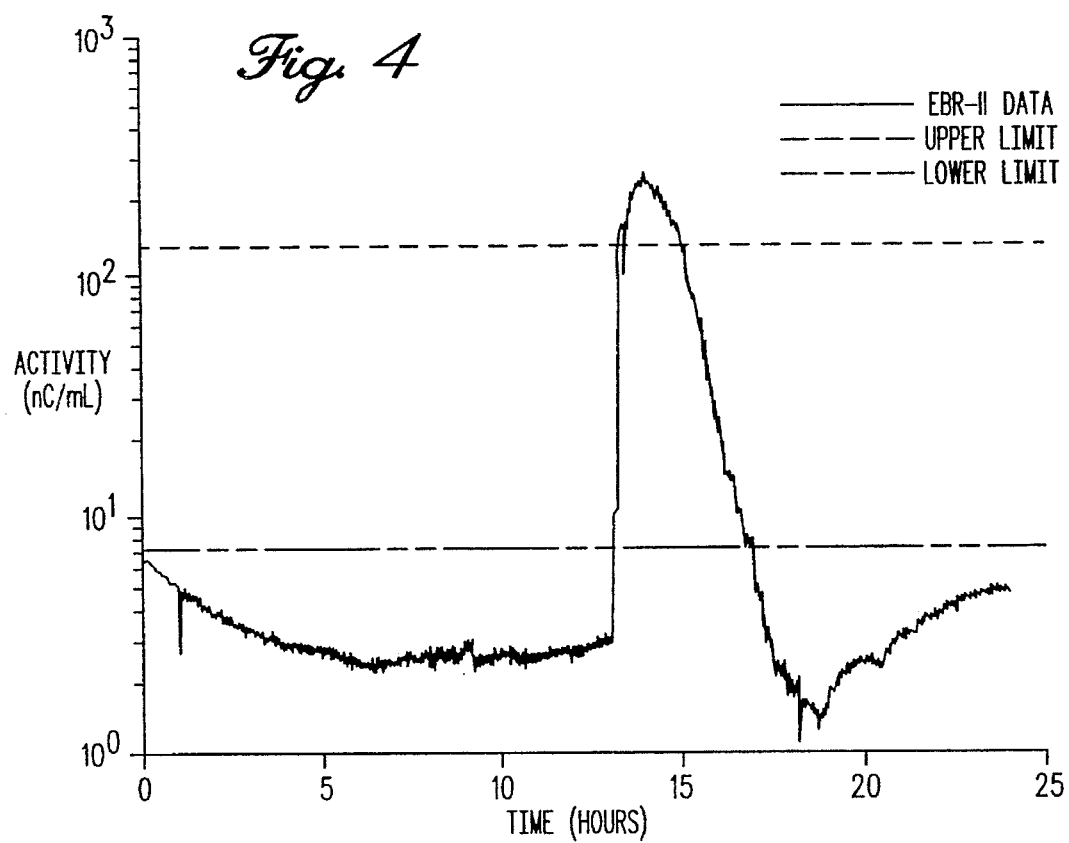

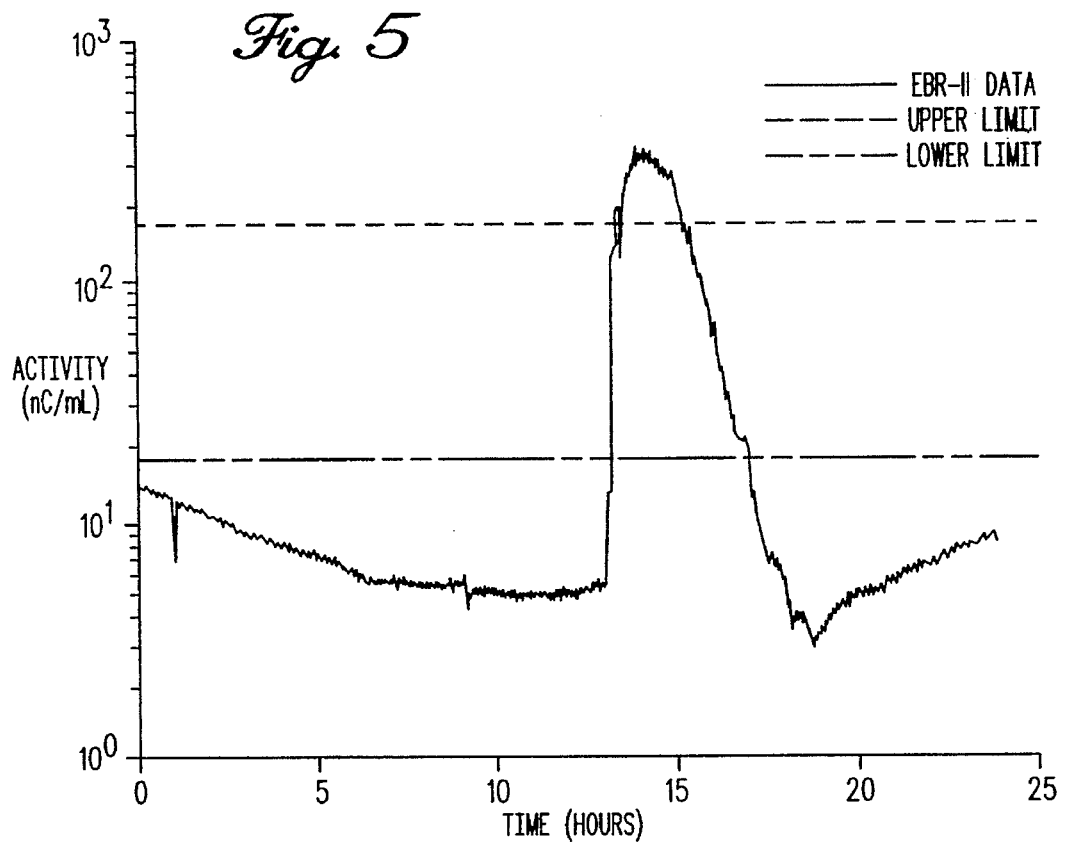
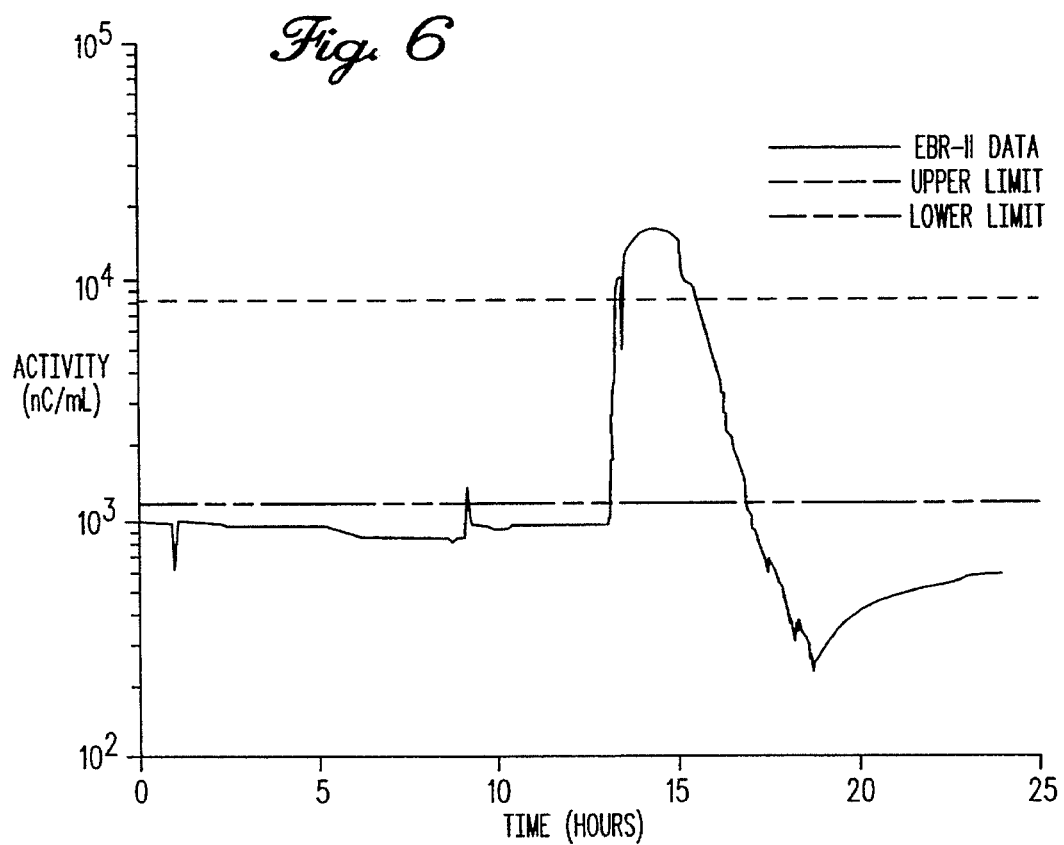

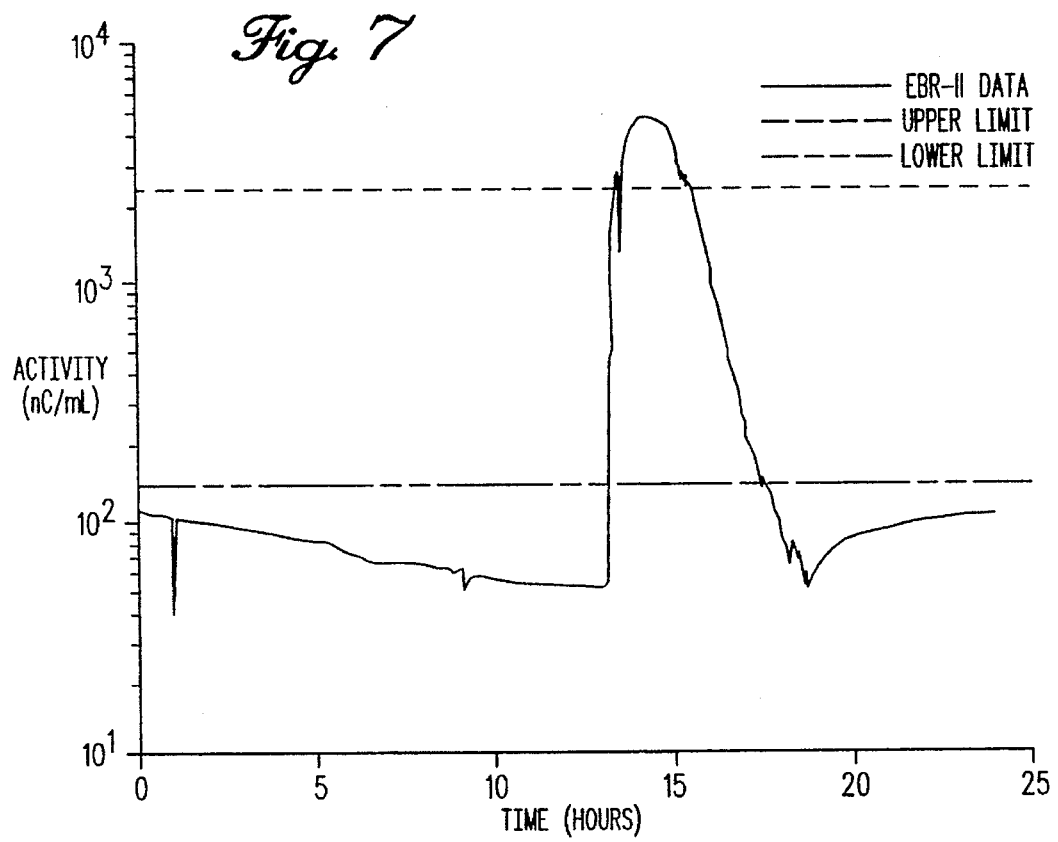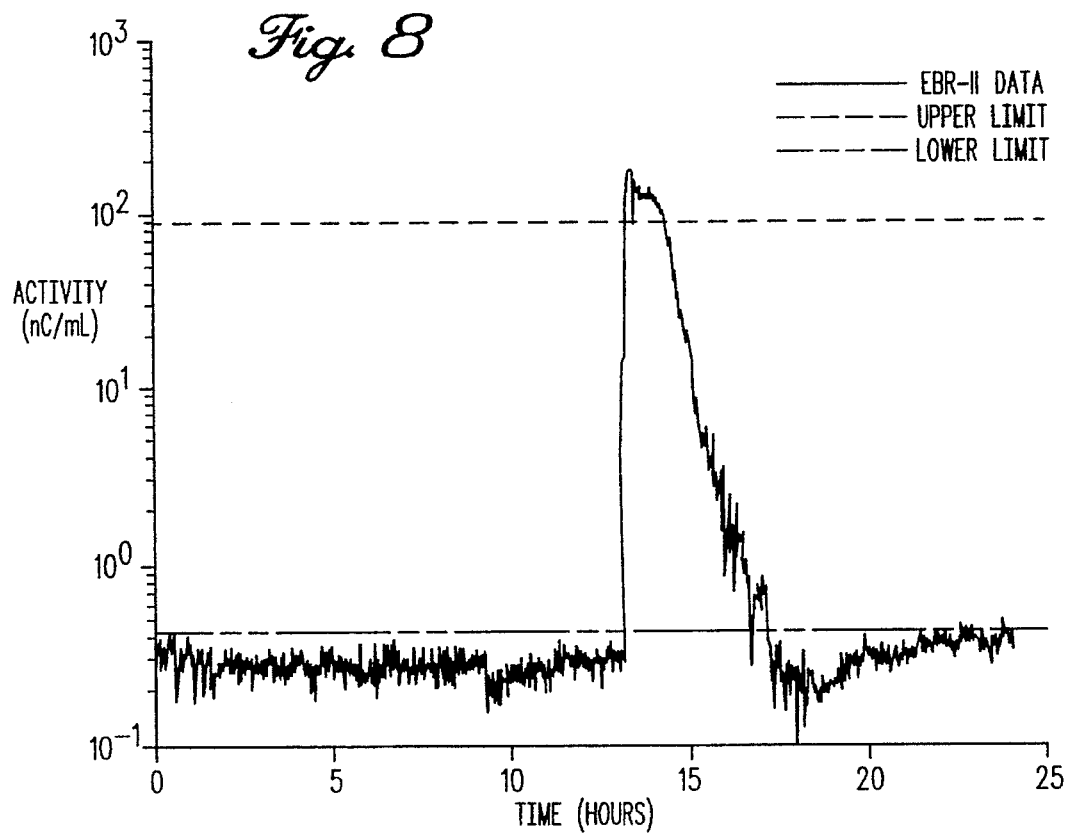

NEURAL NET CONTROLLED TAG GAS SAMPLING SYSTEM FOR NUCLEAR REACTORS

This invention was made with U.S. Government support under Contract No. W-31-109-ENG-38 awarded by the Department of Energy, and the U.S. Government has certain rights in this invention.

The present invention is directed generally to a tag gas system in a nuclear reactor. More particularly, the invention is directed to a method and system for installing gas tags on nuclear fuel rods and sampling any released tag gas to isolate defective nuclear fuel rods. Further, the invention is concerned with a method and system for installing tag gases on light water reactor fuel rods and determining defective fuel rods by sensing a distinct tag gas released therefrom.

Gas tagging of nuclear fuel rods was developed to assist in identifying one of a large number of fuel rods which has developed defects during operation, causing release of the fuel rod tag gas into the reactor coolant system. In breeder reactors it has been possible to collect and utilize tag gases in a straightforward manner since the release of such tag gases is into a cover gas volume overlying a pool of liquid sodium which acts to cool the fuel rods. This cover gas can be sampled easily by passage directly to a coupled mass spectrometer for tag gas analysis and identification of the defective fuel rod. Further details of operation of a breeder reactor and use of tag gases in such a reactor can be found in U.S. Pat. No. 4,495,143 at cols. 6–8, which is incorporated by reference herein. However, in light water reactors one cannot employ a cover gas, and, therefore, identification of the defective fuel rod typically involves reactor shutdown, removal of all the fuel rods to a remote location and leak testing of each fuel rod assembly. The downtime expense associated with such a methodology is on the order of $1 million a day. Further, in light water reactors the tag gases and other non-condensable gases must be eluted from water in which the gases are dissolved, and then purified and concentrated for mass spectrometric analysis. Such procedures add further manpower requirements and can be hazardous due to potential chemical explosions from hydrogen/oxygen byproducts by radiolytic decomposition of water, as well as the radioactivity contamination dangers. The frequency of occurrence of such events arising from defective fuel rods in light water reactors thus indicates substantial cumulative losses and problems occur each year, and improved methods are needed to identify defective fuel rods in light water reactors.

It is therefore an object of this invention to provide an improved method and system for use of tag gases in nuclear reactors.

It is another object of the invention to provide a novel method and system for sensing tag gases released from defective nuclear fuel rods.

It is a further object of the invention to provide an improved method and system for isolating tag gases released from a defective nuclear fuel rod.

It is an additional object of the invention to provide a novel method and system for allocating tag gases to nuclear fuel rods to minimize expense associated with use of the tag gases.

It is still another object of the invention to provide a novel method and system employing a neural net system to monitor gamma ray activities and respond to fuel rod failures using an expert system to perform operational decisions including actuation of tag gas analysis.

It is yet a further object of the invention to provide an improved method and system for automated tag gas removal from coolant water of a light water reactor to eliminate water vapor, combine elemental hydrogen and oxygen and remove elemental nitrogen before passage to a mass spectrometer for analysis.

These and other objects, features and advantages of the invention will be apparent from the following description of the preferred embodiments taken in conjunction with its accompanying drawings described below wherein like elements have like numerals throughout the several views.

BRIEF DESCRIPTION OF THE DRAWINGS

FIG. 2 illustrates a system for automated tag gas sampling, separation and concentration for analysis;

FIG. 3 illustrates gamma ray activity of Kr-85M on Jul. 7, 1986;

FIG. 4 illustrates gamma ray activity of Kr-87 on Jul. 7, 1986;

FIG. 5 illustrates gamma ray activity of Kr-88 on Jul. 7, 1986;

FIG. 6 illustrates gamma ray activity of Xe-133 on Jul. 7, 1986;

FIG. 7 illustrates gamma ray activity of Xe-135 on Jul. 7, 1986;

FIG. 8 illustrates gamma ray activity of Xe-135M on Jul. 7, 1986;

DETAILED DESCRIPTION OF PREFERRED EMBODIMENTS

Figure 1:
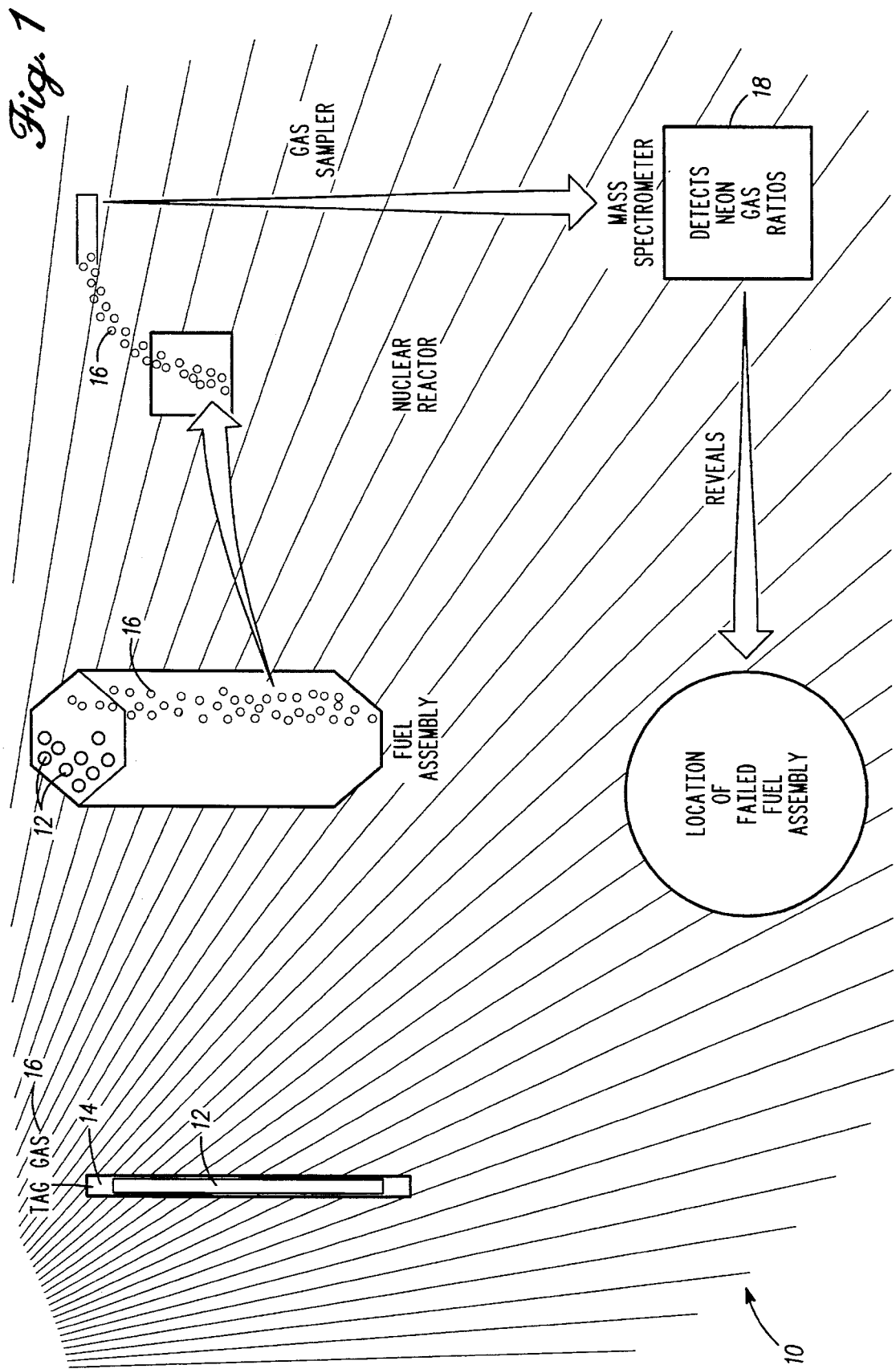
FIG. 1 is a functional block flow diagram of a system of tag gas utilization in a nuclear reactor.
Figure 9:
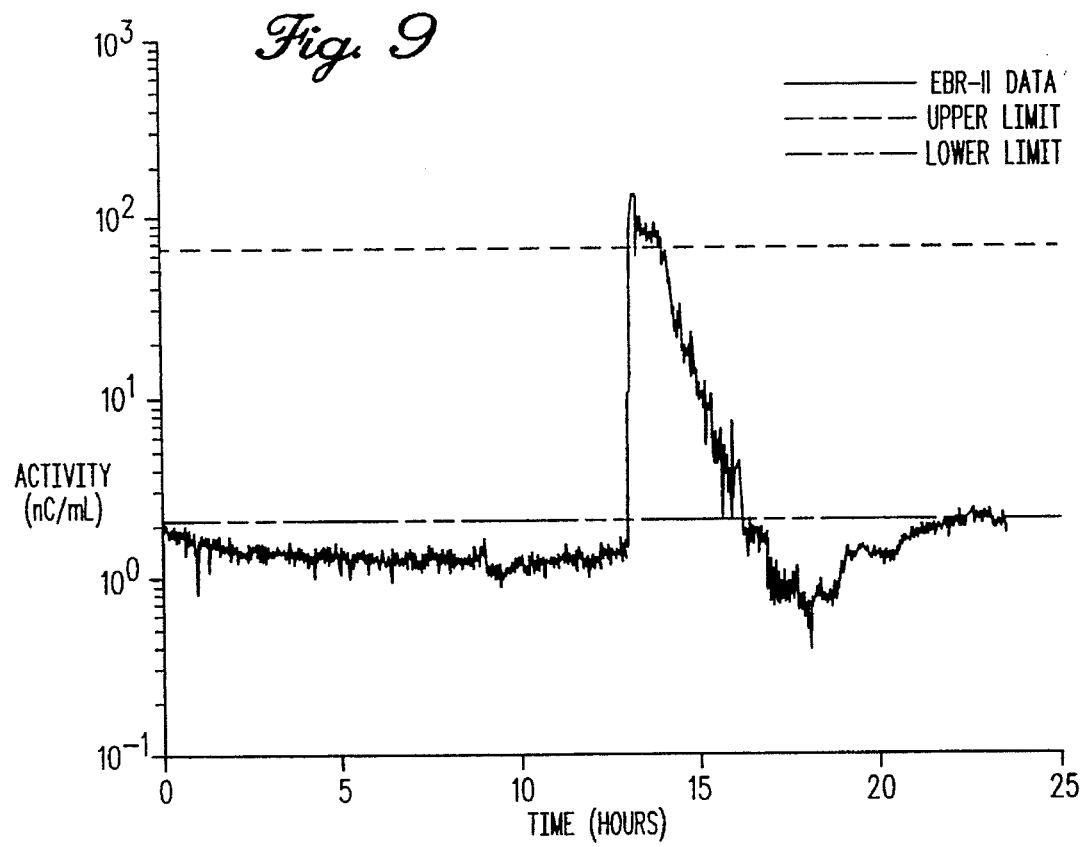
FIG. 9 illustrates gamma ray activity of Xe-138 on Jul. 7, 1986.

A system for gas tagging of fuel rods for identification of failed nuclear fuel rods is shown generally at 10 in FIG. 1. In order to unambiguously identify a particular fuel rod 12 which has undergone failure, an isotopic gas tag 16 is disposed in a plenum region 14 of the fuel rod 12. This tag gas 16 consists of a mixture of isotopic noble gases which have been mixed to provide a unique identifying signature such that, upon failure of the fuel rod 12, the escaping tag gas 16 can be analyzed and related to the one particular fuel rod 12. The methodology of preparing gas tags for the large number of the fuel rods 12 can be carried out by a variety of conventional methodologies, such as are described in U.S. Pat. Nos. 4,495,143 and 5,333,157, which are incorporated by reference herein. As further shown in FIG. 1, the escaping tag gas 16 can be sampled and removed for analysis, such as by a mass spectrometer 18, to identify the composition of the tag gas 16. By comparison with the known tag gas compositions of the array of the fuel rods 12, the particular failed fuel rod 12 can be ascertained.

The sampling, isolation and analysis of the tag gas 16 is shown in detail by reference to FIG. 2. As shown in this figure, a tag gas analysis system 19 is preferably fully automated and is activated to isolate and analyze the escaping tag gas 16 upon command of a neural net supervisory control module 27. Activation of the analysis system 19 occurs whenever a detection system 24 (such as a nuclear plant's germanium-lithium (GeLi) gamma ray spectroscopy system) determines that sensed radiation derives from failure of one or more of the fuel rods 12. In the most preferred embodiment of the invention, the detection system 24 monitors two-dimensional gamma ray spectra 26 (as shown in FIG. 2); and these spectra 26 are analyzed using a neural network module 27. In other forms of the invention the module 27 can be replaced by straightforward threshold alarm systems or other such means to activate analysis of the escaping tag gas 16.

In the most preferred embodiment, the module 27 is also coupled to an expert computer system 28 which implements a conventional expert system computer program. This computer system 28 employs the same rules and logic as a human operator would, but is much faster and more reliable under rapidly changing process conditions. The module 27 therefore continuously monitors gamma ray activities of noble gases in the primary coolant system (not shown). Output from the neural network module 27 is continuously processed by the expert system intelligent controller (the computer system 28). The computer system 28 actuates and controls the separation and analyzation process of the escaped tag gas 16.

The neural network module 27 is a 2-layer, pattern classification network well-known conventionally as a Kohonen network. A detailed example application is set forth in Example 6 hereinafter. In general, the Kohonen network can be used to cluster a set of p continuously-valued vectors $x=(x_1, \ldots, x_i, \ldots, x_n)$ into m clusters. The Kohonen network classifies the p vectors into m groups based on the Euclidean distance. Each group will contain similar, in terms of Euclidean distance, vectors. When a trained form of the network module 27 is presented with a vector that is not a member of the set of p training vectors, the network module 27 will classify the vector into the vector cluster to which it is most similar. In the computer system 28, the module 27 will be presented with vectors which contain seven components. Each vector component will be the gamma activity of one of the noble gas isotopes, measured at a point in time. The module 27 will be trained with gamma ray activity vectors that represent normal background activity, gamma activity vectors during a fission gas release, gamma activity vectors following a fission gas release, and gamma activity vectors during a subsequent fission gas release. Classification of gamma activity vectors into these groups will allow the module 27 to recognize a fission gas release in the form of the tag gas 16.

Training and testing of the module 27 preferably is achieved by use of gamma ray activity measurements from an operating light water reactor (LWR). Testing of the module 27 can be achieved using simulated gamma activity patterns, but preferably one uses historical data from a number of reactor runs for testing. One of the advantages of a Kohonen form of the module 27 is that training is not restricted to supervised learning, wherein the module 27 is trained with input and output pairs of vectors. The module 27 can also be trained by unsupervised learning, in which the module 27 seeks to find patterns or regularity in the input vectors, without reference to output data. In supervised learning, each input vector presented to the module 27 is associated with an output value that represents the classification number of the input vector. In unsupervised training, the module 27 is not told how to classify an input vector, the module 27 decides what class the input vector should belong to. Unsupervised learning can provide an advantage in on-line training of the module 27. Testing of the model 27 with both supervised and unsupervised learning techniques will be required to determine the efficacy of on-line training. This computer system 28 preferably continuously processes, analyzes and interprets the sensed data via the expert logic program, thereby assuring the tag gas analysis system 19 is operated only when necessary. By virtually eliminating the routine human intervention in the separation of the specimen of the tag gas 16, there is enhanced reliability, increased safety for the human operational staff and enhanced processing rate and efficiency for the stream of the tag gas 16 being sampled.

The computer system 28 operates to determine when the sensed gamma ray output necessitates activation of the tag gas analysis system 19. The system 19 includes a vacuum system 29 to draw the tag gas 16 through the system 19. In particular, in a preferred embodiment the order of gas treatment begins with a gas stream 30 of the tag gas 16 being passed through a desiccant dryer 32 to remove water vapor. The gas stream 30 then is passed through a catalytic recombiner 34 to react element hydrogen and oxygen to produce water, thereby eliminating the possibility of hazardous explosions. In the next stage, the gas stream 30 is passed through a conventional nitrogen getter 36 to remove nitrogen present from air in leakage into the gas stream 30. In a last stage of the preferred form of the isolation system 22, a helium cryostill 38 separates the tag gas 16 constituents into containers 40, such as a small (1 ml) steel cylinder. These samples are then transported to a mass spectrometer 42 for analysis and subsequent correlation with the composition of a particular one of the fuel rods 12. In another form of the invention the separated tag gas 16 can be directly passed to the mass spectrometer 42 for analysis.

The following nonlimiting examples illustrate various aspects of the invention.

EXAMPLE 1

A mixture of four candidate noble gases for tag gases was procured from Isotec Inc. and dissolved into 3.785 L (1 gal) of high purity water at Argonne National Laboratory. Relevant chemical compositions are shown in Table 1. The 40-ml noble gas mixture comprised 10 STP ml each of neon, argon, krypton, and xenon. Although a production gas tagging system may use only 1 STP ml of tag gas per rod, this demonstration experiment was designed with 10 ml of each gas in order to provide quantitative concentration dynamics information.

TABLE 1

Oconee-2 Test 1: Chemical Compositions of Solutions Injected into the RCS.

| | Injected Composition | | |
|---|---|---|---|
| Element | Design (STP ml) | Design (volume %) | Measured (volume %) |
| Ne | 10 | 25 | 25.5 ± 1.3 |
| Ar | 10 | 25 | 21.9 ± 1.1 |
| Kr | 10 | 25 | 26.1 ± 0.8 |
| Xe | 10 | 25 | 26.4 ± 0.8 |

The isotopic composition of the tag gas purchased for this demonstration test is listed in Table 2, Column 1. Results of mass spectrometric analysis of the tag mixture performed at ANL-East (Lemont, Ill.) are shown in Table 2, Column 2.

Differences in composition between Table 1, Columns 1 and 2 are attributable to the fact that the mass spectrometers used by Isotec and ANL-East have different mass correction factors. For this reason, it is important that the original reference sample be analyzed on the same mass spectrometer as the final results of the demonstration experiment. A small portion of the Oconee-2 Test 1 tag gas mixture was therefore saved and shipped to ANL-West (Idaho), where all of the mass spectrometry for this demonstration test was performed.

Forty STP ml of the tag gas mixture were blended into 3.785 L (1 gal.) of deaerated, demineralized water in the Analytical Chemistry Laboratory of ANL-East.

TABLE 2

Oconee-2 Test 1: Isotopic Compositions of Solutions Injected into and Drawn out of the RCS.

| Isotope | Injected Composition (atom %) | Injected Composition (volume %) | Drawn Composition (volume %) | Drawn Composition (volume %) | Natural Composition (atom %) |
|---|---|---|---|---|---|
| Ne-20 | 70.83 | 69.7 ± 1.4 | 98.6 ± 0.3% | ND | 90.48 |
| Ne-21 | 0.03 | 0.02 ± 0.01 | <DL | ND | 0.27 |
| Ne-22 | 29.14 | 30.3 ± 1.4 | 1.43 ± 20% | ND | 9.25 |
| Ar-36 | 26.76 | 25.1 ± 1.0 | 23.06 ± 4.0% | 0.4 | 0.337 |
| Ar-38 | 46.46 | 47.2 ± 1.0 | 28.03 ± 4.0% | 0.1 | 0.063 |
| Ar-40 | 26.78 | 27.7 ± 1.3 | 48.91 ± 6.0% | 99.5 | 99.600 |
| Kr-78 | 8.67 | 6.73 ± 0.07 | 13.77 ± 2.8% | <DL | 0.35 |
| Kr-80 | 40.41 | 40.2 ± 0.2 | 19.67 ± 3.9% | <DL | 2.25 |
| Kr-82 | 47.85 | 48.2 ± 0.3 | 15.78 ± 3.2% | <DL | 11.6 |
| Kr-83 | 4.35 | 4.40 ± 0.04 | 13.01 ± 2.6% | <DL | 11.5 |
| Kr-84 | 0.53 | 0.56 ± 0.01 | 34.69 ± 6.4% | <DL | 57.0 |
| Kr-86 | — | 0.005 ± 0.001 | 3.09 ± 1.0% | <DL | 17.3 |
| Xe-124 | 8.67 | 8.36 ± 0.08 | 2.00 ± 0.6% | <DL | 0.10 |
| Xe-126 | 3.38 | 3.28 ± 0.03 | 0.90 ± 0.3% | <DL | 0.09 |
| Xe-128 | 14.39 | 14.3 ± 0.01 | 3.80 ± 1.1% | <DL | 1.91 |
| Xe-129 | 65.34 | 65.8 ± 0.3 | 24.18 ± 10.6% | <DL | 26.4 |
| Xe-130 | 2.99 | 2.96 ± 0.03 | 4.80 ± 1.6% | <DL | 4.1 |
| Xe-131 | 3.99 | 4.00 ± 0.04 | 20.00 ± 6.0% | <DL | 21.2 |
| Xe-132 | 1.21 | 1.23 ± 0.01 | 24.59 ± 7.4% | <DL | 26.9 |
| Xe-134 | 0.03 | 0.032 ± 0.001 | 10.71 ± 3.2% | <DL | 10.4 |
| Xe-136 | — | 0.004 ± 0.001 | 9.07 ± 2.7% | <DL | 8.9 |

The pre-injection activity of trace tag gases in the primary system on 27 July 1993 was obtained from plant chemistry; the activity of selected isotopes is shown in Table 3.

TABLE 3

Pre-injection Activity Levels in the Primary System.

| Isotope | Activity (mCi/m³) |
|---|---|
| Ar-41 | 96.10 |
| Kr-85m | 3.075 |
| Kr-87 | 7.149 |
| Kr-88 | 6.921 |
| Xe-133 | 27.92 |
| Xe-135 | 33.43 |
| Xe-135m | 6.245 |
| Xe-138 | 26.79 |

EXAMPLE 2

The 3.785 L (1 gal) gas/water solution referenced in Example 1 was shipped to Oconee-2 on 28 July 1993. On the day of the test, Tuesday, 3 August 1993 the gas/water solution was injected into the Oconee-2 RCS through a chemical addition tank in the plant's Chemical and Volume Control System. One hour after injection of the mixture sampling was initiated at the plant's main gas sampling hood. An evacuated 450-ml stainless steel sample bomb was provided by ANL for the first sample. The sample bomb was filled in approximately 30-ml increments over a six-hour period. A sequence of five 75-ml samples was drawn at subsequent 8-hour intervals. The objective of the 450-ml sample analysis is to see if all of the candidate tag gas isotopes can be seen and quantified with a mass spectrometer. A secondary objective is to have a sufficiently large sample so that trace impurities present in the Oconee-2 RCS can be identified. The concern is that, even though impurities may be at sufficiently low concentrations such that they do not present operational problems for Oconee-2 from a chemical or neutronic standpoint, they may create interference in the mass spectrometer at the same mass level as tag isotopes. In this case, once the impurities are identified from ANL's analyses, they can be easily filtered in a subsequent experiment or in a production tagging system. Finally, the objective of the sequence of small samples was to determine the removal rate for noble gases from the Oconee-2 RCS.

All gas samples were allowed to decay for approximately one week so that activity levels would be sufficiently low for shipping to ANL-West. The samples were shipped on 11 August 1993.

EXAMPLE 3

The following samples were collected from RCS:

1. One 450-ml sample collected incrementally over a 6-hour period starting 1 hour after injection.

2. Six 100-ml samples collected at 8-hour intervals following the initial 450-ml sample.

The analysis of an RCS sample took place in two separate, consecutive stages, namely: (1) the analysis of Ar, Kr, and Xe as described in Example 3; and (2) the analysis of Ne as covered in Example 4.

An apparatus was used for the initial separation of Ne from the other noble species of Ar, Kr, and Xe in a small cylinder to be subsequently connected to a mass spectrometer. The Ne was collected in a large reservoir for later analysis.

The apparatus included a separation manifold with a flow meter, two traps, three containers, and connections to helium supply and vacuum pumps. The first trap contained copper turnings, was cooled to 195 K (−78° C.) with dry ice. The second trap was an activated carbon trap, cooled to 77 K (−196° C.) with liquid nitrogen. The three containers included one RCS sample cylinder, and two collection containers: a 10-ml collection cylinder where Ar, Kr, and Xe were ultimately concentrated, and 4-L collection reservoir where Ne was stored for subsequent analysis.

The general procedure followed prior to performing the actual separation and concentration of the desired tag gases first involved evacuating and baking the system overnight to remove the water and other contaminates. The second trap, which contained activated carbon, was then charged with helium to approximately 133 kPa (1000 Torr). The carbon trap was then isolated, and the remaining system was again evacuated to approximately 133 µPa (1 µTorr). After system evacuation, the first trap and collection cylinder were also isolated.

Sample gas cylinders were attached to the separation manifold via a three-way valve. The valve was then opened to the separation manifold and the system allowed to equilibrate. The valves to the traps were opened and the gas sample flowed through the flow meter and entered the first of the two traps. The first trap containing copper turnings served to remove water vapor and hydrocarbons. The remaining gas then entered the second activated carbon trap to condense the Ar, Kr, Xe, $O_2$, and some of the $N_2$. The Ne tag gas component passed through the traps and was collected in the evacuated 4-L reservoir. The flow rate was regulated to approximately 16 ml/s (1 L/min). Once the flow dropped to zero, the three-way valve was opened to a helium supply line, and the sample cylinder was charged to approximately 133 kPa (1000 Torr). The three-way valve was rotated to the separation manifold, and the flow rate was maintained at 16 ml/s (1 L/min) until the flow dropped to zero. This procedure was repeated twelve times to ensure that all the tag sample was flushed from the sample cylinder.

The helium carrier and Ne sample gas were collected in the 4-L reservoir. Neon was not concentrated at this stage because the trap temperatures were not sufficiently cold to cause its condensation. Once the tag gas sample had been flushed from the cylinder, the 4-L reservoir was isolated and the remaining system, including the cooled carbon trap, was evacuated to approximately 7 Pa (50 mTorr) to remove non-condensable gases. The carbon trap was then isolated and heated to approximately 373 K (100° C.), the 10-ml collection cylinder cooled to 77 K (−196° C.) and the line connecting the two opened. This allowed the Kr and Xe, collected in the carbon trap, to be transported and concentrated in the 10-ml collection cylinder. The collection cylinder was maintained at 77 K (−196° C.) for approximately one hour followed by evacuation of non-condensable gases a second time. The valve to the collection cylinder was then closed, and the cylinder was removed and placed on the gas mass spectrometer inlet port for analysis.

The smaller-size RCS collected samples were processed as follows: For the 100-ml polyethylene sample containers, each container was placed in a puncture vacuum vessel (PVV) containing a quartz window for optical penetration. The puncture vacuum vessel was then evacuated to approximately 133 Pa (1 Torr). A Nd:YAG laser was used to puncture the polyethylene container the tag gas contents vented to the separation manifold. After the flow rate dropped to zero, the puncture vacuum vessel was backfilled with helium and vented to the separation manifold a total of twelve times thus flushing out the sample container.

Isotopic analysis of the collected tag samples was performed on a modified Nuclide RGA 660 gas mass spectrometer. Prior to RCS sample analysis, (1) pure Ne, Ar, Kr, and Xe samples were initially analyzed to confirm magnet settings, and (2) a background analysis was performed to check instrument performance. The inlet pressure during analysis of collected tag samples ranged from 7 to 1 Pa (50 to 10 mTorr).

The mass spectral analysis results of the 450-ml sample for Ar, Kr, and Xe are shown in Table 2 (See Example 1). The resultant isotopic ratios are significantly different from those found in nature. They are also different from those found in the original tag gas composition. These results would be obtained from a mixture of tag, atmospheric, and fission gas. The overall relative accuracy of the Ar and Kr analysis is ±20%. For the Xe the relative accuracy is ±30%. Organic interference may be present in the Kr spectrum.

Only one of the six 100-ml samples was analyzed. The only appreciable peaks observed for analyzed 100-ml sample were at mass 36, 38, and 40 corresponding to Ar. The percent abundance of the three Ar isotopes indicates a natural composition as shown in Table 2 (Example 1). A large peak at mass 39 was also observed and may be an artifact from the laser induced vaporization of the sample container. The mass region from 75 through 87 (Kr), which is often notoriously contaminated by hydrocarbon species, was featureless, including and possible Kr isotopes. Likewise, the Xe region showed only small mass peaks slightly above the noise level (0.2 to 0.3 mV above the noise level of 0.1 mV) thus making determination of isotopic ratios impossible. Clearly, the volume of sample was too small for a meaningful analysis on the mass spectrometer used. No estimate of precision was made for this analysis as the sample was only measured once.

Clearly, non-natural isotopic abundance of Ne, Ar, Kr and Xe were observed in some of the samples analyzed. It is also apparent that the isotopic compositions were not strictly from the initial tag gas sample. Where variations in isotopic compositions from natural abundances were observed, these are probably a mixture of atmospheric, fission and tag gases.

EXAMPLE 4

As indicated in Example 3, the analysis of the reactor coolant system sample took place in two stages the first of which was the analysis of Ar, Kr, and Xe as described therein. The second stage is the analysis of Ne which was performed separately from the gas collection in the first stage and is covered in this example.

The separation and concentration of Ne is carried out in a small helium cryostat collection cylinder which is directly connected to a mass spectrometer. The cylinders containing the samples or standards were connected directly to the cryostat collection cylinder and vacuum system.

Before sample collection, the vacuum lines connecting the sample and collection cylinders were evacuated to approximately 133 µPa (1 µTorr). The cryostat collection cylinder was also evacuated, isolated from the vacuum system and cooled to 9 K (−264° C.). The remaining system was then isolated from the vacuum and the valves of the two cylinders opened to allow cryopumping of the sample to the collection cylinder which was maintained at a temperature of 9 K (−264° C.). The minimum cryopump time was eight hours during which the sample cylinder was heated to approximately 343 K (70° C.).

Helium content reduction was accomplished in the following fashion. For samples that contain helium carrier gas, the helium content was reduced after sample collection by opening the cryostat collection cylinder valve to the vacuum system and evacuating the collection cylinder to several hundred millipascals (several millitorr). The collection cylinder was maintained at 9 K (−264° C.) during helium evacuation. The removal of helium carrier gas did not affect the tag constituents condensed in the collection cylinder or their isotopic composition. However, after prolonged and repeated evacuation of the collection cylinder, while cooled to 9 K (−264° C.), a significant loss of Ne tag gas occurred.

The concentration of Ne tag gas collected along with helium carrier gas in the 4-L reservoir during the initial separation stage (Example 3) was performed as follows. For the 450-ml sample, the 4-L reservoir was connected directly to a C-22S Janis Research Company helium cryostat that contained a collection cylinder attached to the secondary coldhead where temperatures in the neighborhood of 10 K (−263° C.) were obtained. The concentration of Ne, which requires temperatures below the boiling point of nitrogen for condensation, was performed by cryopumping Ne from the 4-L reservoir into the helium cryostat which was maintained at a temperature of 10 K (−263° C.). The reservoir was heated to approximately 343 K (70° C.) and cryopumped for 16 hours.

At the time of cryogenic collection, it was not physically possible to connect the helium cryostat coldhead and compressor to either the Nuclide 6-60 RGA mass spectrometer at CGCS, or the Varian MAT CH7 mass spectrometer located in the ANL-W Analytical Laboratory. Therefore, only the cryostat collection cylinder, removed from coldhead, was connected to the CGCS mass spectrometer and the sample analyzed at ambient temperature.

The isotopic compositions of Ne and Ar, determined from the unresolved mass spectrum are shown in Tables 2 (Example 1) and 4, respectively. In the mass spectral region of Ne, a strong peak was observed at mass 20, and a much smaller peak reduced by roughly a factor of 60, was observed at mass region 22. No peak was found at mass 21. The relatively intense peak at mass 20 undoubtedly had significant contribution from the interfering species $^{40}Ar^{++}$. It should be noted that both the Varian MAT CH7 and the CGCS Nuclide 6-60 instruments have insufficient mass spectral resolving power to separate the $^{20}Ne$ and $^{40}Ar^{++}$ peaks if operated as they were: in dynamic mode and without any attempt to reduce interferences; however, several options are available to eliminate interferences even on the same mass spectrometer and they are further discussed in Example 5.

TABLE 4

Oconee-2 Test 1: Argon Isotopic Compositions of Solutions Injected into and Drawn out of the RCS.

| | Injected | | Drawn | Natural Composition |
|---|---|---|---|---|
| Isotope | Composition (atom %) | Composition (volume %) | Composition (volume %) | sition (atom %) |
| Ar-36 | 26.76 | 25.1 ± 1.0 | 0.34 ± 2% | 0.337 |
| Ar-38 | 46.46 | 47.2 ± 1.0 | 0.07 ± 5% | 0.063 |
| Ar-40 | 26.78 | 27.7 ± 1.3 | 99.6 ± 0.01% | 99.600 |

The uncorrected Ne isotopic composition appears to be depleted in $^{22}Ne$, however, the combination of $^{40}Ar^{++}$ interference signals would explain the overly abundant $^{20}Ne$. The signal observed at mass 22 may indicate the presence of tag $^{22}Ne$, although possible interferences in this mass spectral region might include $CO_2^{++}$, the magnitude of which was not known. The isotopic composition of Ar agrees well with natural Ar. If Ar tag gas were present in the original sample, the tag Ar must have been collected on the activated carbon bed during the first separation (Example 3). The Ar observed in this analysis was probably from atmospheric contamination. Thus, mass spectral analysis may indicate the presence of Ne tag gas.

EXAMPLE 5

For the measurement of $^{20}Ne$ while in the presence of Ar, three methods were used to reduce the influence of the interfering signal:

1. The first was to separate Ne and Ar before the mass spectral analysis;

2. The second method was to background subtract the $^{40}Ar^{++}$ signal from the $^{20}Ne$ signal, which is a standard procedure performed at ANL-E; and 3. The third was to reduce the energy of the ionizing electrons in the ionization source of the mass spectrometer. Background correction was not possible during the analysis of the sample because of the difficulty in determining total sample composition and partial pressure/output signal response on the CGCS instrument.

One available avenue for the elimination of mass spectral interference is the separation of noble species prior to mass spectral analysis. This may be performed using a cryostat. The purpose of the following experiment is to characterize the capability of the Model C-22S Janis helium cryostat to collect noble gas species from noble gas mixtures. Special experiments were performed using natural Ne, Ar, and tag library standards to determine the performance of the cryostat.

Table 5 shows the isotopic composition of natural Ne and Ar after collection in the helium cryostat and subsequent mass spectral analysis at a cryostat temperature of 9 K (−264° C.). The accuracy of the isotopic composition is generally better than 5 percent at the 95 percent confidence level.

TABLE 5

Isotopic Composition of Natural Ne and Ar Determined by Mass Spectrometry with Cryostat at a Temperature of 9 K.

| Isotope | Measured Composition (volume 5%) | Tabulated Natural Composition (atom %) |
|---|---|---|
| Ne-20 | 90.43 ± 0.2% | 90.48 |
| Ne-21 | 0.26 ± 1% | 0.27 |
| Ne-22 | 9.30 ± 2% | 9.25 |
| Ar-36 | 0.31 ± 6% | 0.337 |
| Ar-38 | 0.05 ± 7% | 0.063 |
| Ar-40 | 99.64 ± 0.1% | 99.600 |

The isotopic composition of the Isotec Ne/Ar/Kr/Xe tag library sample QW2028 was determined both at ambient temperature and after cryogenic separation using the helium cryostat. Table 6 shows the isotopic composition results for the two analyses. Differences in Ne and Ar isotopic composition between the two measurements are significant and show a reduction in the $^{20}$Ne to $^{22}$Ne and $^{40}$Ar to $^{36}$Ar ratios. This indicates a separation of interfering species, namely $^{40}$Ar and $^{80}$Kr, from $^{20}$Ne and $^{40}$Ar respectively. At the coldest cryostat setting of approximately 9 K (−264° C.), as indicated by the silicon temperature diode on the cryostat, substantial vapor pressures, on the order of 10 mTorr, of Ne and Ar were observed. These vapor pressures are greater than what would be expected for condensed Ne and Ar at this temperature. It is speculated that because the cryostat collection cylinder extends well above the coldhead and temperature diode, the upper reaches of the collection cylinder are warmer and incomplete condensation occurs. The instrumental configuration with a large evacuated volume, consisting of the vacuum lines and a large inlet reservoir to the mass spectrometer, above the cryostat collection cylinder would also shift the equilibrium from the condensed to the vapor phase.

The increase in Ar vapor pressure was measured over a cryostat temperature range of approximately 10 K (−263° C.) to 90 K (−183° C.). The rate of Ar vapor pressure increase remained very low, approximately 44 mPa/s (20 mTorr/min), from a temperature of 10 K (−263° C.) to 70 K (−203° C.). The vapor pressure then increased rapidly over a temperature range of 80 K (−193° C.) to 90 K (−183° C.) to about 2000 mTorr/min. The boiling point of Ar is 87 K (−186° C.) at a standard (atmospheric) pressure.

Temperature diode calibration was also attempted using Ne. It was found that the Ne vapor pressure increased steadily with temperature from 9 K (−264° C.) to 30 K (−243° C.). The boiling point of Ne is 27 K (−264° C.) at standard pressure, and approximately 15 K (−258° C.) at 1.3 Pa (10 mTorr). A large increase in Ne vapor pressure near the boiling point temperature was not observed as in the case of Ar. Thus, when working with Ne, the minimum cryostat temperature [~9 K (−−264° C.)] should be maintained. It was also noted that the cryostat temperature controller is less stable at lower temperatures. Determination of the cryostat collection capacity of Ne was attempted by introducing a known volume of Ne and recording the decrease in pressure after cryopumping for one hour. The decrease in pressure was less than could be detected by the capacitance diaphragm instrument used in this study. Therefore, the collection cylinder was then placed on the CH7 mass spectrometer which has a more sensitive capacitance diaphragm detector. The CH7 inlet system volume is not accurately known, however. The collection cylinder was opened to the mass spectrometer in a static mode and the pressure recorded. The system volume was approximated and an approximation in the collected Ne volume was made of 0.1 ml. The cryostat's collection capacity of Ar, Kr, and Xe is much greater: on the order of tens of cubic centimeters for Ar.

Isotopic fractionation studies were performed over various temperature ranges and after successive sample evacuations. The ratio of $^{36}$Ar to $^{40}$Ar at 9 K is about 0.0031, about

TABLE 6

Isotopic Composition Comparison of Isotec Library QW2028 Analyzed by Mass Spectrometry (a) At Ambient Temperature and with No Separation or Background Correction and (b) After Cryogenic Separation.

| | Without Cryogenic Separation | With Cryogenic Separation | |
|---|---|---|---|
| Isotope | Composition (volume %) | Cryostat Temperature (K) | Composition (volume %) |
| Ne-20 | 72.3 | 9 | 71.4 ± 0.2% |
| Ne-21 | ND | | 0.02 ± 10% |
| Ne-22 | 27.3 | | 28.6 ± 0.5% |
| Ar-36 | 24.4 ± 0.3 | 35 | 26.2 ± 2% |
| Ar-38 | 45.36 ± 0.1 | | 47.4 ± 0.4% |
| Ar-40 | 30.2 ± 0.1 | | 26.4 ± 2% |
| Kr-78 | 6.66 | 85 | 6.43 ± 4% |
| Kr-80 | 40.5 | | 40.9 ± 2% |
| Kr-82 | 48.1 | | 48.9 ± 2% |
| Kr-83 | 4.28 | | 4.07 ± 5% |
| Kr-84 | 0.46 | | 0.52 ± 3% |
| Kr-86 | 0.01 | | ND |
| Xe-124 | 8.55 | 85 | 8.5 |
| Xe-126 | 3.28 | | 3.33 |
| Xe-128 | 14.2 | | 14.2 |
| Xe-129 | 66.3 | | 66 |
| Xe-130 | 2.78 | | 2.75 |
| Xe-131 | 3.82 | | 4.03 |
| Xe-132 | 1.04 | | 1.14 |
| Xe-134 | 0.03 | | 0.03 |
| Xe-136 | 0.01 | | 0.01 |

0.0033 at 30 K, about 0.0035 at 40 K, 0.003 at 50 K and 0.0035 at 90 K. After each successive increase in temperature, the collection cylinder was opened to the vacuum system and evacuated for 1 minute, the collection cylinder was isolated and allowed to equilibrate followed by mass spectral analysis. This was repeated until a cryostat temperature of 90 K (−183° C.) was reached at which time the system was allowed to equilibrate and analysis performed. No clear trend in Ar fractionation is evident within the error of the measurement.

For Ne isotopic fractionation studies, the cryostat was maintained at approximately 9 K (−264° C.). The system was then evacuated to approximately 13 mPa (100 μTorr), allowed to equilibrate and mass spectral analysis performed. No significant trend in Ne fractionation was seen within the uncertainty of the measurements.

EXAMPLE 6

Development of the neural network surveillance module 27 for the system 10 is based on fission-gas release events in a liquid metal reactor (LMR) (for example, EBR-II). Output from the two Germanium-Lithium Argon Scanning System (GLASS) gamma detectors in EBR-II provides the gamma activities of the seven fission gas components that are used as inputs to the neural network model. Three fission-gas release candidates from the past ten years have been identified, and the gamma activity data from the events have been extracted from EBR-II data acquisition system (DAS) tapes. Reduction to practice for a preferred embodiment of the integrated neural network/expert system module 27 has been achieved and is illustrated using these LMR gamma activity patterns.

The prototype of the neural network surveillance module 27 for the system 10 has been implemented in the MATLAB environment, and initial testing of it has been completed. The model utilizes six categories to classify gamma activity date, such that the likelihood of a fission gas release increases with category number. Simple limit switches are not being used to activate the system 10 because of the variability in gamma activity signals following a fission gas release. A surveillance system utilizing limit switches is susceptible to missed and false activations. If the limit switches are set too low, the system 10 would be activated during spurious increases in gamma activity such as those that occur during power changes. Also the system 10 would be prone to false activations following a fission gas release, when the system 10 is most needed to detect subsequent fission gas releases. If the limit switches are set too high, the system 10 would be prone to missing slow fission gas release events. The solution to this problem is to use fuzzy decision boundaries instead of the distinct decision boundaries provided by conventional limit switches. Fuzzy decision boundaries have been implemented with an LVQ network in the following manner. First, two limits are defined for each of the seven fission gas activities. One of the limits is set to a low value, only a few standard deviations above the background activation. The second limit is set high to a level that can only be reached soon after a fission gas release. The six output categories are defined as follows: category 1 - all seven gamma activities are below the lower limits, category 2 - one to three of the gamma activities fall between the two limits, category 3 - four to seven of the activities fall between the two limits, category 4 - one to two of the activities exceed the upper limits, category 5 - three to six of the activities exceed the upper limits, and category 6 - all activities exceed the upper limits. With this classification pattern, the decision boundary becomes fuzzy, with a range of probabilities from a very low probability of fission gas release (category 1) to a very high probability of fission gas release (category 6). The activities used for the low and high limits, the number of limits defined for each fission gas source, the number of categories used in the network, and which category is used to activate the system 10 are all variables that can be adjusted to optimize the performance of the model for any particular LWR reactor. The LVQ network provides a flexible and robust surveillance module for the system 10.

The prototype model was trained with gamma activity data from a fission gas release event occurring on July 7, 1986 in EBR-II. The prototype model was then tested with gamma activity data from three fission gas release events. FIGS. 3–9 show the gamma activity of each of the seven isotypes from the July 7 event. The data shown in these figures are the average of the measurements taken by the two GLASS gamma detectors. The figures also show the lower and upper activity limits used in the test calculations. The lower limits are four standard deviations above the mean activity readings of the first 10 hours of data. The upper limits are equal to one-half of the peak activities for each of the isotopes. The activity limits for the test calculations utilize the preferred procedure for the neural network surveillance module 27. Namely, the lower activity limits should be set to values that are just above the normal background activity levels for the fission gas isotopes, while the upper activity limits should be set to values that are only exceeded during a fission gas release event. With the activity limits as defined above, the category of each of the activity vectors (i.e., the activities of the seven isotopes as measured at a given point in time) was determined. Utilizing the gamma activity data from July 7 as network inputs and the corresponding category data as network targets, the prototype model was trained. In the first test calculation, the trained network was tested with the July 7 data.

Figure 10:
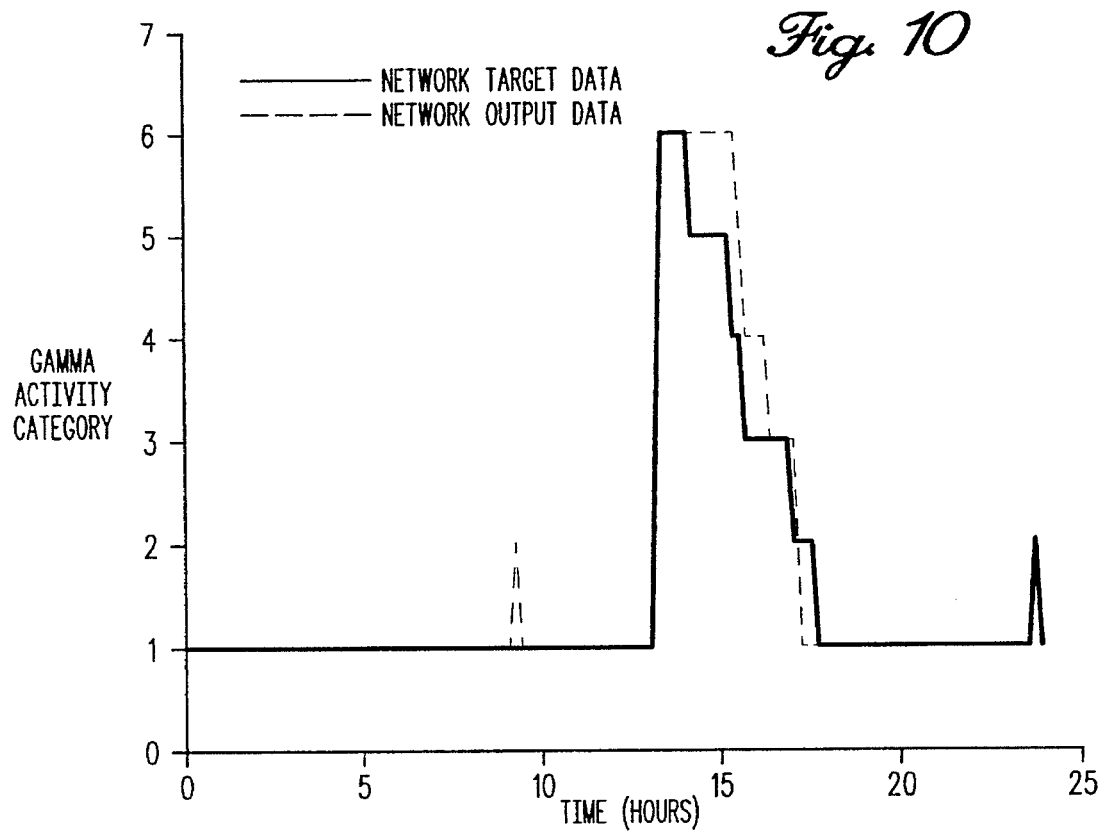
FIG. 10 shows a test calculation for Jul. 7, 1986 fission gas release.

The ability of the module 27 to learn the input data is shown in FIG. 10, which contains plots of the output of the test calculation and the network target data. The great similarity between the network output and target data indicates that the module 27 has memorized the input data. More importantly, FIG. 10 shows that the upper categories (i.e., categories 3 through 6), which signal a fission gas release event, are triggered by the module 27 exactly at the time expected. Thus the neural network module 27 would activate the expert system controller at the right time.

Figure 11:
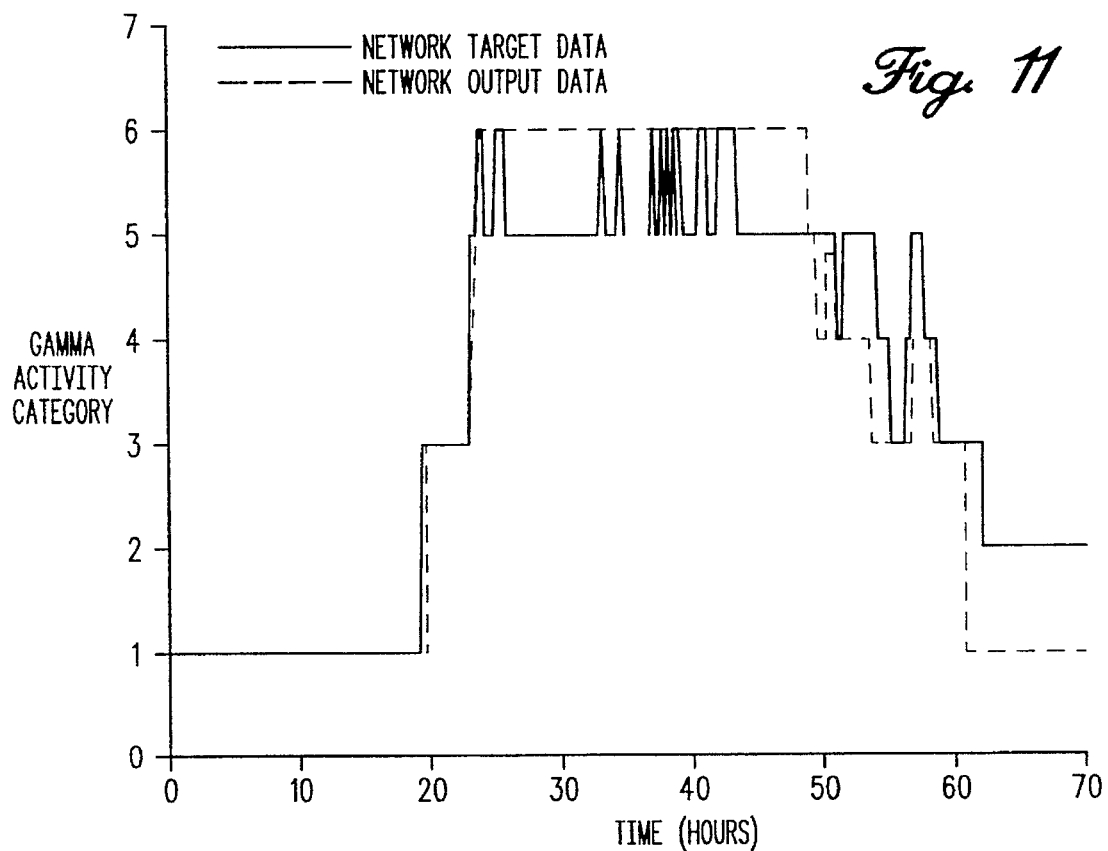
FIG. 11 shows a test calculation for a March, 1989 fission gas release.
Figure 12:
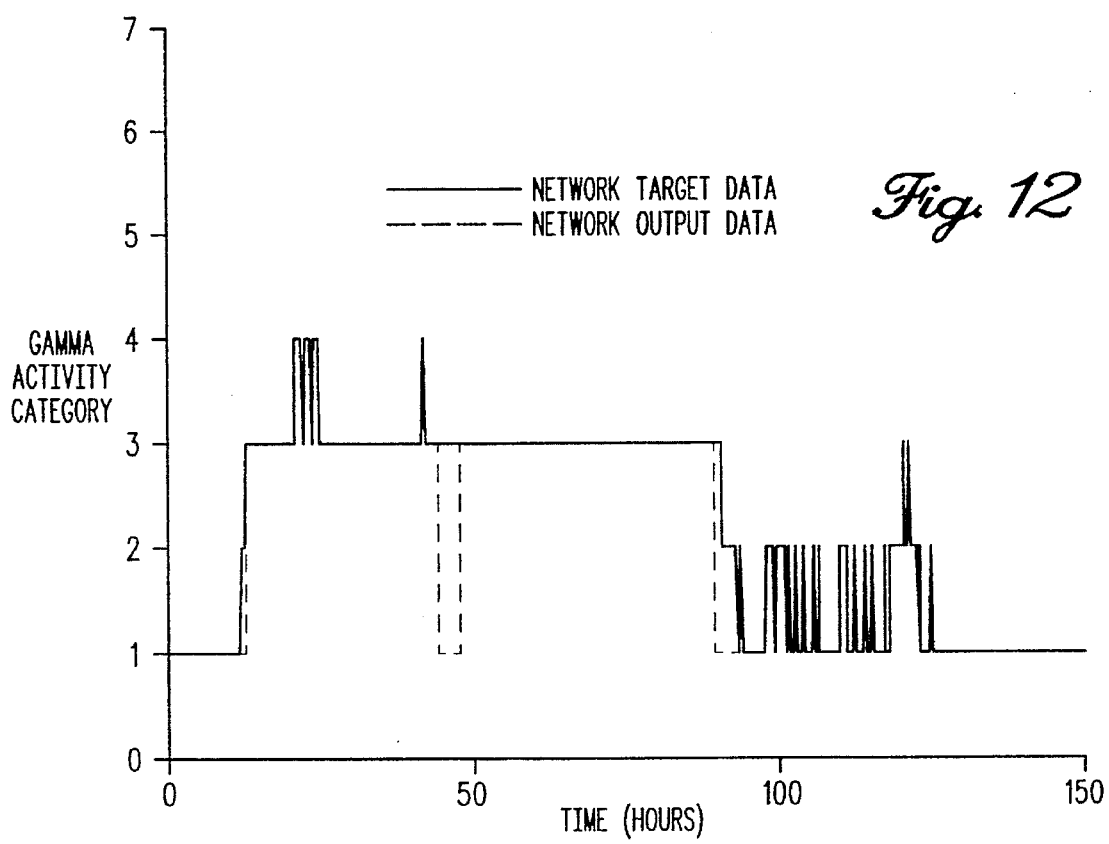
FIG. 12 shows a test calculation for a January, 1989 fission gas release.

The ability of the prototype model to recognize general fission gas release events is demonstrated in FIGS. 11 and 12. These figures show the results of tests of the trained module 27 with gamma activity data taken from March, 1989 and January, 1989. During March, 1989, a large fission gas release event occurred in EBR-II, elevating gamma activity levels over a period of three days. Gamma activities during the event increased slowly, reaching peak values about 20 hours after a fuel pin began to fail. Gamma activity from the March, 1989 event was fed into the trained neural network module 27, which classified each of the input vectors into one of the six fission gas release categories defined in the model. In FIG. 11, the results of the neural network calculation are compared to the target data for the March 1989 event. Although the network module 27 has some difficulty producing the anticipated response during the later stages of the event, it does signal the onset of the fission gas release accurately. The January, 1989 event resulted in elevated gamma activity levels for a period of six days. Peak gamma activity levels did not reach the upper limits, except for the Xe-138 isotope whose peak value was about 10% above its upper limit. Therefore, the January, 1989 event was barely a category 4 event. In FIG. 12, the results of the neural network calculation are compared to the target data for the January, 1989 event. Although the network module 27 does not recognize the peak category reached by the event, it again signals the onset of the fission gas release accurately. Unlike the July, 1986 event which produced a single well-defined peak, the January and March 1989 events produced broad, poorly-defined gamma activity peaks. The neural network module 27 was able to correctly identify the fission gas release events, despite the erratic nature of the gamma activity patterns. The ability of the prototype model to recognize general fission gas release events is clearly established by these test calculations.

One of the advantages of the neural networks developed by the Kohonen is that learning in the network module 27 is not restricted to supervised learning, wherein the network module 27 is trained with pairs of input and output vectors. The Kohonen type of the network module 27 can also learn in an unsupervised mode, during which the network module 27 seeks to find patterns or regularity in the input vectors, without reference to output data. In supervised learning, each input vector presented to the network module 27 is associated with an output value that represents the classification number of the input vector. In unsupervised training, the network module 27 is not told how to classify an input vector: the network module 27 decides what class the input vector should belong to. Unsupervised learning can provide an advantage in on-line training of the network module 27. The flexibility of being able to test the network module 27 with both supervised and unsupervised learning techniques and to select the approach which is optimal for a specific LWR plant is an additional advantageous feature.

While preferred embodiments of the invention have been shown and described, it will be clear to those skilled in the art that various changes and modifications can be made without departing from the invention in its broader aspects as set forth in the claims provided hereinafter.

What is claimed is:

1. A method of providing nuclear fuel rods with a tag gas and analyzing escaped tag gas to identify a failed nuclear fuel rod in a nuclear reactor, comprising the steps of:
   (a) disposing a unique composition tag gas into a nuclear fuel rod;
   (b) monitoring gamma ray activity associated with the nuclear reactor to generate monitor signals;
   (c) analyzing the monitor signals to diagnose abnormal gamma ray activity associated with escaping tag gas arising from a failed nuclear fuel rod and generating analysis signals; and
   (d) activating a tag gas analysis system by generating an activation signal upon detecting the abnormal gamma ray activity, said tag gas analysis system carrying out the steps comprised of:
      (1) passing the escaping tag gas through a dryer to remove water vapor;
      (2) passing the dried tag gas through a catalytic recombiner;
      (3) passing the tag gas through a nitrogen getter;
      (4) passing the tag gas through a helium cryostill to separate the tag gas into separate noble gas constituents;
      (5) collecting the separated noble gas constituents in containers for analysis; and
      (6) analyzing the noble gas constituents to enable identifying said failed nuclear fuel rod.

2. The method as defined in claim 1 wherein the step of monitoring comprises evaluating the gamma ray activity using a neural network surveillance module.

3. The method as defined in claim 2 wherein the surveillance module processes a computer program implementing a Kohonen network methodology.

4. The method as defined in claim 3 wherein the surveillance module undergoes operational training using normal gamma ray activity, gamma ray activity during fission gas release, gamma ray activity after fission gas release and gamma ray activity subsequent to fission gas release.

5. The method as defined in claim 4 wherein the gamma ray activity is measured from a light water reactor (LWR).

6. The method as defined in claim 3 wherein the Kohonen network methodology is performed by carrying out unsupervised learning during observation of the gamma ray activity.

7. The method as defined in claim 1 wherein the steps of activating the tag gas analysis system comprises an expert computer system executing a computer program which evaluates the analysis signals to decide whether to generate the activation signal.

8. The method as defined in claim 1 wherein the step (d)(1) comprises passing the tag gas through a desiccant dryer.

9. The method as defined in claim 1 wherein the step (d)(2) comprises passing the tag gas through a catalytic recombiner for reacting hydrogen and oxygen.

10. The method as defined in claim 1 wherein the step (d)(3) comprises using a resistance heated titanium sponge getter to remove nitrogen present from inleakage into the escaping tag gas.

11. The method as defined in claim 1 wherein the step (d)(4) comprises passing the tag gas through the helium cryostill to isolate noble gas constituents of the tag gas selected from the group consisting of Ne, Ar, Kr and Xe.

12. The method as defined in claim 1 wherein the step (d)(5) comprises passing the separated noble gas constituents directly to a mass spectrometer having separate chambers functioning as the containers for analysis.

13. The method as defined in claim 1 wherein the step (d)(6) comprises performing mass spectrometric analysis of the noble gas constituents.

14. The method as defined in claim 1 further including a step (d)(7) comprised of comparing analysis data obtained in step (d)(6) to standards to identify the gas composition and comparing to tabulated data of a plurality of unique tag gas compositions characteristic of unique nuclear fuel rods, thereby identifying the failed nuclear fuel rod.

* * * * *